United States Patent
Norton, Jr. et al.

(10) Patent No.: US 11,481,510 B2
(45) Date of Patent: Oct. 25, 2022

(54) CONTEXT BASED CONFIRMATION QUERY

(71) Applicant: Lenovo (Singapore) Pte. Ltd., Singapore (SG)

(72) Inventors: Robert James Norton, Jr., Raleigh, NC (US); Robert James Kapinos, Durham, NC (US); Russell Speight VanBlon, Raleigh, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 339 days.

(21) Appl. No.: 16/724,696

(22) Filed: Dec. 23, 2019

(65) Prior Publication Data

US 2021/0192069 A1   Jun. 24, 2021

(51) Int. Cl.
*G06F 21/62* (2013.01)
*G06F 16/635* (2019.01)
*G06F 3/16* (2006.01)

(52) U.S. Cl.
CPC .......... *G06F 21/6227* (2013.01); *G06F 3/167* (2013.01); *G06F 16/635* (2019.01); *G06F 21/6245* (2013.01)

(58) Field of Classification Search
None
See application file for complete search history.

(56) References Cited

U.S. PATENT DOCUMENTS

| | | | |
|---|---|---|---|
| 11,003,417 B2* | 5/2021 | Choi | G10L 17/24 |
| 2008/0141353 A1* | 6/2008 | Brown | G10L 13/00 704/260 |
| 2014/0330559 A1* | 11/2014 | Higbie | G06Q 30/0203 704/235 |
| 2014/0379336 A1* | 12/2014 | Bhatnagar | G10L 15/22 704/235 |
| 2017/0006040 A1* | 1/2017 | Pemmaraju | H04L 63/18 |
| 2017/0103754 A1* | 4/2017 | Higbie | G10L 25/78 |
| 2017/0161016 A1* | 6/2017 | McDunn | G06F 3/013 |
| 2019/0012373 A1* | 1/2019 | Malik | H04L 67/565 |
| 2020/0175154 A1* | 6/2020 | Ratnakaram | G06F 21/32 |

FOREIGN PATENT DOCUMENTS

CN    102232223 A * 11/2011 .......... G06F 3/0416

* cited by examiner

*Primary Examiner* — Sanchit K Sarker
(74) *Attorney, Agent, or Firm* — Ference & Associates LLC

(57) ABSTRACT

One embodiment provides a method, including: receiving, at an audio capture device associated with an information handling device, command input from a user; providing, to the user and responsive to receiving the command input, a confirmation query, wherein the confirmation query is formed utilizing context data associated with an authorized user; determining, using a processor, whether a response to the confirmation query provided by the user matches a predetermined answer; and performing, responsive to determining that the response matches the predetermined answer, a function corresponding to the command input. Other aspects are described and claimed.

18 Claims, 3 Drawing Sheets

CONTEXT BASED CONFIRMATION QUERY

BACKGROUND

Modern information handling devices ("devices"), for example laptop and/or personal computers, tablet devices, smart phones, smart speakers, smart appliances, and the like, have access to private user information and/or are capable of performing a variety of different functions, some of which may be sensitive in nature. As a result of the foregoing, an increasing emphasis has been placed on device security. More particularly, a number of security measures now exist that attempt to ensure that only authorized users may be able to access private information and/or to perform certain actions.

BRIEF SUMMARY

In summary, one aspect provides a method, comprising: receiving, at an audio capture device associated with an information handling device, command input from a user; providing, to the user and responsive to receiving the command input, a confirmation query, wherein the confirmation query is formed utilizing context data associated with an authorized user; determining, using a processor, whether a response to the confirmation query provided by the user matches a predetermined answer; and performing, responsive to determining that the response matches the predetermined answer, a function corresponding to the command input.

Another aspect provides an information handling device, comprising: an audio capture device; a processor; a memory device that stores instructions executable by the processor to: receive command input from a user; provide, to the user and responsive to receiving the command input, a confirmation query, wherein the confirmation query is formed utilizing context data associated with an authorized user; determine whether a response to the confirmation query provided by the user matches a predetermined answer; and perform, responsive to determining that the response matches the predetermined answer, a function corresponding to the command input.

A further aspect provides a product, comprising: a storage device that stores code, the code being executable by a processor and comprising: code that receives command input from a user; code that provides, responsive to receiving the command input, a confirmation query, wherein the confirmation query is formed utilizing context data associated with an authorized user; code that determines whether a response to the confirmation query provided by the user matches a predetermined answer; and code that performs, responsive to determining that the response matches the predetermined answer, a function corresponding to the command input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
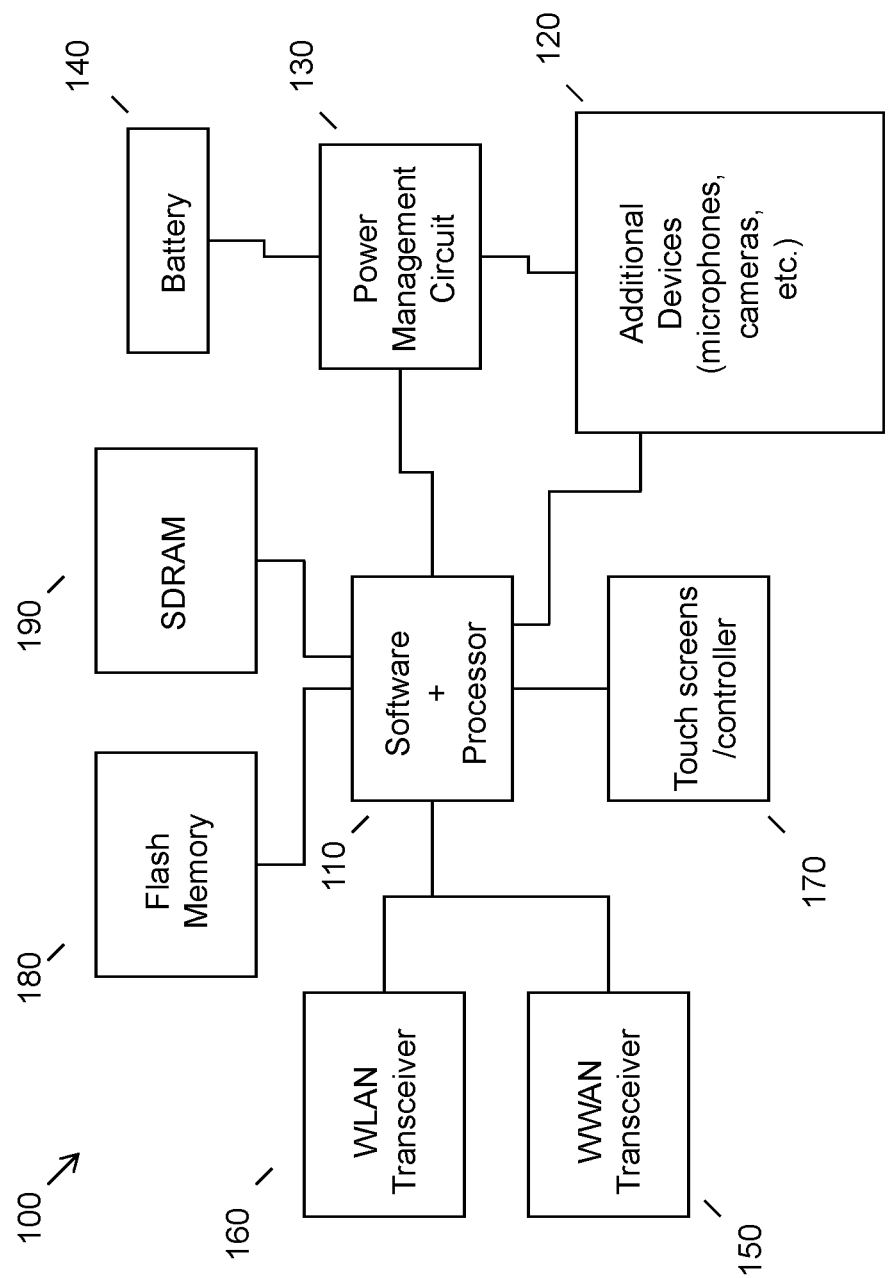
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A variety of security measures exist today that attempt to prevent bad actors from gaining access to private information and/or from utilizing devices to perform unauthorized functions. For example, as a minimum, many devices require a user to enter a passcode (e.g., an alphanumeric pass code, a predetermined swipe pattern, etc.) prior to granting the user access to a home screen. As another example, biometric authentication techniques (e.g., facial recognition, fingerprint recognition, audible analysis, etc.) are frequently employed to verify the identity of an individual based on a physiological or behavioral characteristic.

Although capable of barring access to content responsive to detecting an incorrect password input and/or an unrecognizable biometric signature, conventional security systems still contain a number of issues. For example, systems containing biometric devices may be costly to employ and require a catalog of the user's biometrics to be already stored. Additionally, bad actors have developed a variety of different malicious techniques to obtain a certain password or to fool biometric-based security systems (e.g., by utilizing a spoofed image, video, and/or sound recording of an authorized user, etc.).

Accordingly, an embodiment provides a method for providing an alternative user authentication technique that may enhance system security. In an embodiment, command input may be received or detected by a device. In response to the command input, an embodiment may provide a confirmation query to the input-providing user. The confirmation query may be formed by using one or more aspects of context data associated with an authorized user (e.g., prior or planned physical and/or virtual activity data engaged in by the authorized user, etc.). Responsive to receiving an answer from the user, an embodiment may determine whether the answer shares a predetermined level of similarity to a predetermined correct answer. If it does, then an embodiment may perform a function dictated by the command input. Such a method may better ensure that information is provided, and commands are performed, only for authorized users.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
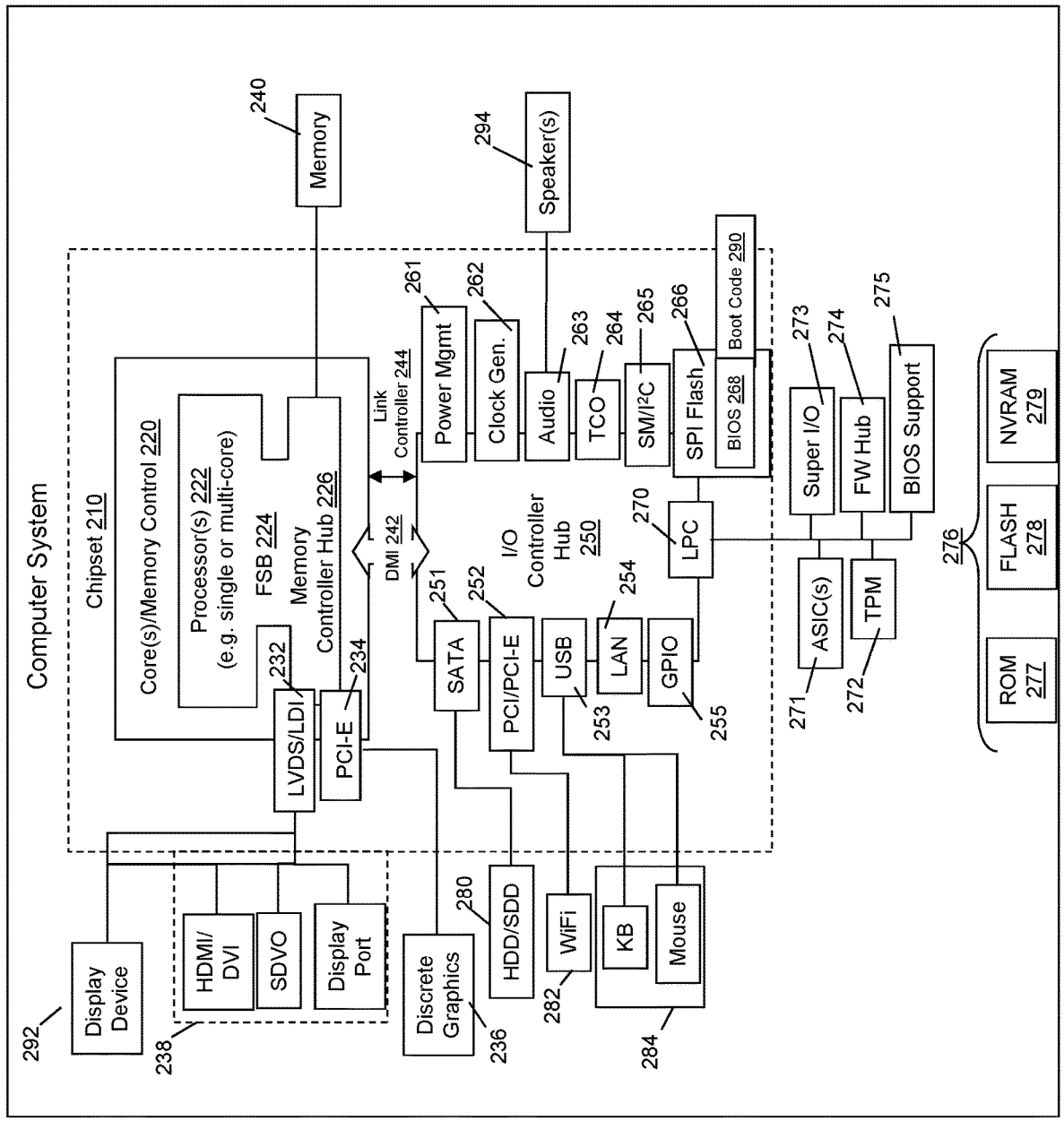
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of receiving and processing user command inputs and providing corresponding output. For example, the circuitry outlined in FIG. 1 may be implemented in a smart phone or tablet embodiment, whereas the circuitry outlined in FIG. 2 may be implemented in a laptop.

Figure 3:
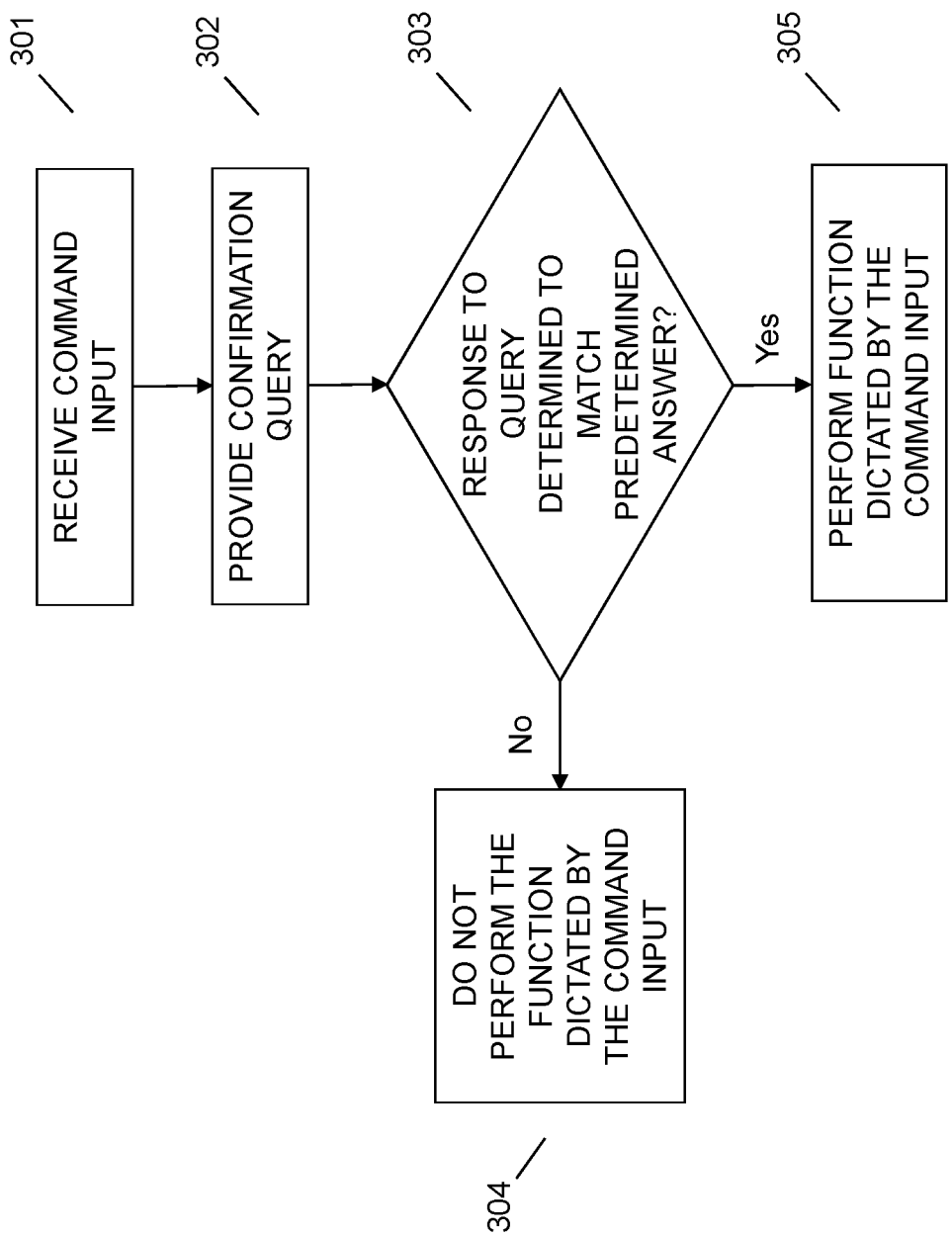
FIG. 3 illustrates an example method of providing a context based confirmation query in response to a user command.

Referring now to FIG. 3, an embodiment provides a method for providing a dynamic security question as a form of secondary authentication. At 301, an embodiment may receive a command input from a user. The command input may be a command to the device to perform a particular function (e.g., open a door, adjust a lighting setting, transfer money, etc.) or to retrieve and provide requested information (e.g., designated by a user query, etc.). In an embodiment, the command input may be provided using virtually any known input type (e.g., audible input, keyboard input, touch input, gesture input, etc.) and may be detected by a corresponding input capture device (e.g., a microphone, a hard or soft keyboard, a capacitive display, a static or dynamic camera, etc.). In an embodiment, the device may be a single device or may be part of a plurality of connected devices (e.g., connected to one or more other Internet of Things (IoT) devices, etc.). For simplicity purposes, the remainder of this application will be described with reference to audible command input captured by a microphone. However, it is important to note that this designation is not limiting and that other types of command inputs, as described above, may also be utilized.

At 302, an embodiment may provide a confirmation query in response to the received command input. The confirmation query may be a challenge question that demands a correct response. The confirmation query may be provided via any conventional output type (e.g., audible output, visual output, etc.) and through any corresponding output device (e.g., speaker, display screen, etc.). In an embodiment, the confirmation query may be formed from context data associated with an authorized user. Within the bounds of this application, context data may refer to virtually any type of prior or planned physical and/or virtual activity data. Non-limiting examples of relevant context data may include a sporting event played in or attended by an authorized user, a location previously visited by an authorized user, steps taken by an authorized user at a particular location or within a certain time period, websites recently navigated to by an authorized user, movies or TV shows recently watched by an authorized user, an upcoming meeting that an authorized user plans to attend, and the like.

In an embodiment, the context data may be stored and/or retrieved from one or more accessible sources. For example, the context data may be retrieved from an authorized user's calendar data, browser history data, social media data, textual communication data, etc. In an embodiment, an authorized user may designate the contextual sources that may be accessed by the device. Additionally, an authorized user may have control over the formulation of the confirmation query. For example, an authorized user may provide a designated list of confirmation queries that an embodiment may cycle through and utilize. Alternatively, a system of the embodiments may dynamically form the confirmation queries but may utilize some prior input from the authorized user in doing so. For instance, the authorized user may instruct the system to only utilize context data from a past predetermined time period (e.g., from the last 24 hours, last week, etc.) or from certain events.

In an embodiment, prior to provision of the confirmation query, an embodiment may first identify a risk level associated with the command input. The risk level may be one of a low risk level or a high risk level. A command associated with a low risk level may not pose any threat to a user, their private data, their financial interests, etc. (e.g., a command to recite recent sports scores, a command to provide a definition for a word, a navigation command, etc.). Conversely, a command associated with a high risk level may pose one of the aforementioned risks (e.g., a command to open a user's home door, a command to access a financial account, a command to retrieve personal information, etc.). In an embodiment, the risk level may determine how an embodiment reacts to the command input. More particularly, for a command input associated with a low risk level, an embodiment may perform the corresponding task without providing a confirmation query. Alternatively, for a command input associated with a high risk level, an embodiment may provide a confirmation query prior to performing any requested function.

As a continuation of the foregoing, in another embodiment, a system may dynamically adjust the difficulty of confirmation queries based upon the degree of high risk. Stated differently, a confirmation query may be provided in response to all command inputs associated with a high risk level, however, the difficulty in providing a correct answer to the confirmation query may proportionally increase as the risk level associated with the command input increases. For example, a command input to withdraw or transfer money from a user's bank account may be considered higher risk than a command input to show a user's recent emails and may therefore be met with a tougher confirmation query. In an embodiment, a more difficult confirmation query may be a query having an answer that would likely only be available to, or may only be known by, an authorized user. Additionally or alternatively, a more difficult confirmation may be a query having an answer that even an authorized user may not know the immediate answer to but would need to consult a source that virtually only the authorized user has access to. As an example of the foregoing concepts, a command input demanding to see an authorized user's emails may be met with the confirmation query, "Where was Authorized User A yesterday afternoon?" whereas a command input demanding to withdraw money from an authorized user's bank account may be met with the more difficult confirmation query, "How many steps did Authorized User A take at the location they were at yesterday afternoon?". The latter query may have an answer that could only be determined from consulting an authorized user's fitness tracker.

In an embodiment, the provision of a confirmation query, or the difficulty of the confirmation query, may be influenced at least in part by an identity of a command-providing user. For example, a command input provided by a user's spouse may not be met with any confirmation query or may be met with a confirmation query of normal difficulty. Alternatively, a command input provided by an unidentified individual (i.e., a stranger) may be met with a difficult confirmation query.

At 303, an embodiment may determine whether a response to the confirmation query, provided by the user, matches a predetermined answer. In this regard, an embodiment may analyze the content of the user's response (e.g., via audio analysis, word parsing and analysis via speech-to-text, etc.) and compare the analyzed content to a predetermined answer associated with the confirmation query. In embodiment, a list of answers to each confirmation query may be stored at an accessible storage location available locally on the device or, alternatively, may be stored remotely (e.g., on another device or server, etc.) and made accessible to the device (e.g., via a wireless network connection, etc.). As briefly discussed above, a predetermined answer may be explicitly designated by the authorized user or may be dynamically deduced by a system based on the information available in the context data.

In an embodiment, the determination may involve determining a level of similarity between the provided answer and a predetermined correct answer. More particularly, an embodiment may determine whether the answer provided by the user shares a predetermined number of same or similar words (e.g., 80% of the same words, 90% of the same words, etc.) to the predetermined correct answer. In another embodiment, an embodiment may determine whether a context associated with the answer shares a predetermined level of similarity to the predetermined correct answer, regardless of whether or not the answer shares any of the same words to the predetermined correct answer. For example, the predetermined correct answer to the confirmation query "What movie did Authorized User A watch last night?" may be "Harry Potter". If a user provides the answer "the movie that has magic, witches, and wizards", an embodiment may conclude, based upon available knowledge of the Harry Potter series, that the context surrounding the answer provided by the user is substantially to the predetermined correct answer.

Responsive to determining, at 303, that an answer to the confirmation query does not match a predetermined answer, an embodiment may, at 304, not perform a function designated by the command input. Additionally or alternatively, an embodiment may provide another, different confirmation query. Additionally or alternatively, in an embodiment, responsive to detecting an incorrect answer, or a series of consecutive incorrect answers (e.g., 3, 4, 5, etc.), an embodiment may provide a notification to an authorized user informing them of the failed answer attempt(s). For example, an embodiment may transmit a notification (e.g., a push notification, an SMS text communication, an email, etc.) to a device designated as being associated with the authorized user (e.g., an authorized user's smart phone, smart watch, etc.). Conversely, responsive to determining, at 303, that an answer to the confirmation query does match a predetermined answer, an embodiment may, at 305, perform a function designated by the command input.

The various embodiments described herein thus represent a technical improvement to conventional methods of authenticating a user. Using the techniques described herein, an embodiment may receive a command input provided by a user. In response, an embodiment may provide the user with a confirmation query. The confirmation query may be formed from context data associated with an authorized user. After an answer from a user is received, an embodiment may determine whether the answer matches a predetermined correct answer for the confirmation query. Responsive to determining that it does, an embodiment may perform a corresponding function dictated by the command input. Such a method may provide an increased level of security by better ensuring that sensitive information and/or high risk functions are only accessed by and performed for authorized users.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

receiving, at an audio capture device associated with an information handling device, command input from a user;

providing, to the user and responsive to receiving the command input, a confirmation query, wherein the confirmation query is formed utilizing context data associated with an authorized user and wherein the confirmation query comprises a risk level associated with the command input, wherein the risk level determines a difficulty in providing a correct answer to the confirmation query and wherein the difficulty proportionally increases as the risk level associated with the command input increases;

determining, using a processor, whether a response to the confirmation query provided by the user matches a predetermined answer, wherein the determining whether the response matches the predetermined answer comprises determining whether the response shares a predetermined level of semantic similarity with the predetermined answer; and performing, responsive to determining that the response matches the predetermined answer, a function corresponding to the command input.

2. The method of claim 1, wherein the context data is stored in at least one accessible data source and wherein the at least one accessible data source is designated by the authorized user.

3. The method of claim 1, wherein the context data comprises data selected from the group consisting of prior physical activity data, prior virtual activity data, upcoming physical activity data, and upcoming virtual activity data.

4. The method of claim 1, wherein the providing the confirmation query comprises providing the confirmation query responsive to determining that the command input is associated with a high risk level.

5. The method of claim 4, wherein the high risk level is identified from at least one of: a requested function dictated by the command input and an identity of the user providing the command input.

6. The method of claim 1, wherein the confirmation query is randomly generated.

7. The method of claim 1, further comprising not performing, responsive to determining that the response does not match the predetermined answer, the function corresponding to the command input.

8. The method of claim 7, further comprising transmitting, responsive to determining that the response does not match the predetermined answer, a notification to a device associated with the authorized user.

9. The method of claim 7, further comprising:
receiving, responsive to determining that the response does not match the predetermined answer, another command input from the user; and
providing another confirmation query, wherein the another confirmation query is different from the confirmation query.

10. An information handling device, comprising:
an audio capture device;
a processor;
a memory device that stores instructions executed by the processor to:
receive command input from a user;
provide, to the user and responsive to receiving the command input, a confirmation query, wherein the confirmation query is formed utilizing context data associated with an authorized user and wherein the confirmation query comprises a risk level associated with the command input, wherein the risk level determines a difficulty in providing a correct answer to the confirmation query and wherein the difficulty proportionally increases as the risk level associated with the command input increases;
determine whether a response to the confirmation query provided by the user matches a predetermined answer, wherein to determine whether the response matches the predetermined answer comprises determining whether the response shares a predetermined level of semantic similarity with the predetermined answer; and
perform, responsive to determining that the response matches the predetermined answer, a function corresponding to the command input.

11. The information handling device of claim 10, wherein the context data is stored in at least one accessible data source and wherein the at least one accessible data source is designated by the authorized user.

12. The information handling device of claim 10, wherein the context data comprises data selected from the group consisting of prior physical activity data, prior virtual activity data, upcoming physical activity data, and upcoming virtual activity data.

13. The information handling device of claim 10, wherein the instructions executable by the processor to provide the confirmation query comprise instructions executable by the processor to provide the confirmation query responsive to determining that the command input is associated with a high risk level.

14. The information handling device of claim 13, wherein the high risk level is identified from at least one of: a requested function dictated by the command input and an identity of the user providing the command input.

15. The information handling device of claim 10, wherein the instructions are further executable by the processor to not perform, response to determining that the response does not match the predetermined answer, the function corresponding to the command input.

16. The information handling device of claim 15, wherein the instructions are further executable by the processor to transmit, responsive to determining that the response does not match the predetermined answer, a notification to a device associated with the authorized user.

17. The information handling device of claim 15, wherein the instructions are further executable by the processor to:
receive, responsive to determining that the response does not match the predetermined answer, another command input from the user; and
provide another confirmation query, wherein the another confirmation query is different from the confirmation query.

18. A non-transitory computer program product, comprising:
a storage device that stores code, the code being executable by a processor and comprising:
code that receives command input from a user;
code that provides, responsive to receiving the command input, a confirmation query, wherein the confirmation query is formed utilizing context data associated with an authorized user and wherein the confirmation query comprises a risk level associated with the command input, wherein the risk level determines a difficulty in providing a correct answer to the confirmation query and wherein the difficulty proportionally increases as the risk level associated with the command input increases;
code that determines whether a response to the confirmation query provided by the user matches a predetermined answer, wherein the code that determines whether the response matches the predetermined answer comprises determining whether the response shares a predetermined level of semantic similarity with the predetermined answer; and
code that performs, responsive to determining that the response matches the predetermined answer, a function corresponding to the command input.

* * * * *